US010633181B2

(12) United States Patent
Butcher et al.

(10) Patent No.: US 10,633,181 B2
(45) Date of Patent: Apr. 28, 2020

(54) REFUSE COLLECTION VEHICLE AND SYSTEM THEREFOR

(71) Applicant: Bucher Municipal Pty Ltd, Vic (AU)

(72) Inventors: Edward Butcher, Vic (AU); Steven Cataldo, Vic (AU); Bradley Clarke, Vic (AU)

(73) Assignee: Bucher Municipal Pty Ltd, Victoria (AU)

( * ) Notice: Subject to any disclaimer, the term of this patent is extended or adjusted under 35 U.S.C. 154(b) by 158 days.

(21) Appl. No.: 15/676,601

(22) Filed: Aug. 14, 2017

(65) Prior Publication Data

US 2018/0044109 A1 Feb. 15, 2018

(30) Foreign Application Priority Data

Aug. 15, 2016 (AU) ................................ 2016216541

(51) Int. Cl.

*B66F 9/19* (2006.01)
*B66F 17/00* (2006.01)
*B65F 3/00* (2006.01)
*B60P 1/50* (2006.01)
*B65F 3/04* (2006.01)
*B65F 3/02* (2006.01)

(52) U.S. Cl.

CPC ................ *B65F 3/041* (2013.01); *B65F 3/00* (2013.01); *B65F 2003/0279* (2013.01)

(58) Field of Classification Search

None

See application file for complete search history.

(56) References Cited

U.S. PATENT DOCUMENTS 8,423,280 B2 4/2013 Edwards et al.
8,768,583 B2 * 7/2014 Hargrave, Jr. .......... E02F 9/262 701/50
9,113,047 B2 8/2015 Onuma et al.
(Continued)

FOREIGN PATENT DOCUMENTS

EP 0909959 A2 4/1999
JP 10-213292 A 8/1998

*Primary Examiner* — Adam D Tissot

(74) *Attorney, Agent, or Firm* — Barnes & Thornburg LLP; Jeffrey R. Stone

(57) ABSTRACT

The invention provides a safety system for use with a refuse collection vehicle having a refuse storage body and a front cabin, the system operating to detect the presence of an object or person in the vicinity of the vehicle and communicate with a lifting operation system. The vehicle has a lifting mechanism for engagement with a refuse bin, the lifting operation system operable to move the lifting mechanism between a lowered position at which the bin is on the ground in front of the vehicle and a raised position for discharge of the bin contents into the interior of the refuse storage body. The safety system including one or more sensors able to monitor an area in the vicinity of the vehicle where the lifting mechanism lifts and lowers bins and a controller operative to receive input data from said at least two sensors and process said data to determine the presence of an object or person, the controller operative to control functioning of the lifting operation system in accordance with the determination by the controller. The invention further provides a vehicle incorporating such a safety system, such as a front loading refuse collection vehicle.

30 Claims, 6 Drawing Sheets

(56) References Cited

U.S. PATENT DOCUMENTS

| | | | | |
|---|---|---|---|---|
| 2003/0130765 | A1* | 7/2003 | Pillar | B60L 50/15 701/1 |
| 2005/0187712 | A1* | 8/2005 | Callaghan | B66B 5/0031 701/301 |
| 2013/0153333 | A1* | 6/2013 | Richards | B66F 11/044 182/18 |
| 2015/0077281 | A1* | 3/2015 | Taniguchi | B60R 1/00 342/27 |
| 2018/0319642 | A1* | 11/2018 | Pronger | B66F 9/0755 |

* cited by examiner

REFUSE COLLECTION VEHICLE AND SYSTEM THEREFOR

FIELD OF THE INVENTION

The present invention relates to refuse collection vehicles. In particular, the invention has application to front-end loading refuse collection vehicles, and systems for use with such vehicles, however it also has applications to other types of refuse collection vehicles, including side loading refuse collection vehicles.

BACKGROUND OF THE INVENTION

Several different general types of refuse collection vehicles are commonly used in collecting refuse. Front-end loading refuse collection vehicles, or ‘front loader vehicles’, are generally used for collecting refuse from larger or commercial sites, such as office buildings, schools, shops, factories, hospitals, etc. In this type of operation, the refuse is collected in a large bin, which is then emptied by the front loader vehicle. The vehicle is equipped towards its front end with a hydraulically-driven lifting mechanism, comprising lifting arms and fork arms. The vehicle driver/operator positions the vehicle with the bin positioned forwardly of the vehicle cabin, adjusts the separation of the fork arms (if applicable) to accommodate the bin width, manoeuvres the vehicle to engage the fork arms with the bin by way of fork slots or pockets provided in the outer side walls of the bin, and then raises the lifting arms. This lifts the bin from and over the front of the vehicle, thus bringing the bin to a generally inverted position over a top opening of the refuse storage body of the vehicle, and so dumping the contents therein. The bin is then returned by lowering to the ground in a reverse operation to the raising operation, and the fork arms withdrawn from the bin fork slots. The operation generally involves control of both the lifting arms and the fork arms, and the control can be wholly manual, or can be semi-automatic.

The refuse, once dumped in the vehicle storage body, can then be compacted by movement of an internal compacting mechanism that reciprocates to push the refuse rearwardly, to provide room for the next bin load. Once the vehicle is filled, it is driven to a dump site and unloaded, generally through opening a tailgate of the storage body and operating the compacting mechanism to drive the contents in a rearward direction.

The movement of a bin lifting mechanism, and in particular a front loader lifting mechanism, can be a relatively complex and sometimes dangerous operation, particularly for any person or object in the vicinity. Front loader bins are large and heavy, and the operator needs to very carefully observe and control the bin’s movement through both lifting and lowering, to ensure the operation is progressing satisfactorily, and to avoid any interference between the moving assembly and any other objects in the vicinity. This can mean that during operation the operator’s attention is focused on the bins rather than on the surrounding environment. There is a very real danger of accidental injury to a person who may pass in front of the vehicle during the bin lowering operation, and indeed such accidents have happened in recent years.

SUMMARY OF THE INVENTION

In a first aspect, there is provided a safety system for use with a refuse collection vehicle having a refuse storage body and a longitudinal centreline, the system operating to detect the presence of an object or person in the vicinity of the vehicle and communicate with a vehicle lifting operation system, wherein the vehicle has a lifting mechanism for engagement with a refuse bin, the lifting operation system operable to move the lifting mechanism between a lowered position at which the bin is on the ground in front of the vehicle and a raised position for discharge of the bin contents into the interior of the refuse storage body, the safety system including:

at least two sensors able to monitor an area in the vicinity of the vehicle; and a controller operative to receive input data from the at least two sensors and process the data to determine the presence of an object or person in the area, the controller further operative to control the functioning of the lifting operation system in accordance with the determination by the controller, wherein a first and a second of the at least two sensors are each spaced at least 800 mm from the longitudinal centreline.

This arrangement allows the sensors to be mounted facing substantially in the forward direction, while maximising the field of view and hence the protection provided. By way of example, in comparison to other systems, the field of view is advantageously provided under arms of the lifting mechanism, enhancing the protection provided.

In an embodiment, the first and a second of the at least two sensors are each spaced at least 850 mm from the centreline, preferably at least 900 mm from the centreline, more preferably at least 950 mm from the centreline, and yet more preferably at least 1000 mm from the centreline.

In a second aspect, there is provided a safety system for use with a refuse collection vehicle having a refuse storage body and a front cabin , the system operating to detect the presence of an object or person in the vicinity of the vehicle and communicate with a lifting operation system, wherein the vehicle has a lifting mechanism for engagement with a refuse bin, the lifting operation system operable to move the lifting mechanism between a lowered position at which the bin is on the ground in front of the vehicle and a raised position for discharge of the bin contents into the interior of the refuse storage body, the safety system including:

at least two sensors positioned on the front of the cabin, able to monitor an area substantially in front of the vehicle; and a controller operative to receive input data from the at least two sensors and process the data to determine the presence of an object or person, the controller further operative to control functioning of the lifting operation system in accordance with the determination by the controller, wherein the front cabin has two opposed sides defining the right and left lateral extent of the cabin, each of a first and second of the at least two sensors being positioned close to a respective side of the cabin, the spacing being less than 300 mm.

The left and right sides of the vehicle front cabin can thus be seen to be nominally defined by two substantially vertical planes parallel to the front cabin longitudinal centreline, each sensor positioned within 300 mm of a respective one of the vertical planes.

This arrangement allows the sensors to be mounted facing substantially in the forward direction, while maximising the field of view and hence the protection provided.

In an embodiment, the spacing is no more than 200 mm, and preferably no more than 120 mm.

In accordance with various aspects of the invention, including the above first and second aspects, the monitored area may include:

a danger zone comprising an area in the vicinity of the vehicle through which a bin moves when the lifting mechanism moves between the lowered position and the raised position;

wherein, when the lifting operation system is operating to lower the lifting mechanism and an object or person is detected in the danger zone, the lifting operation system is not able to further lower the lifting mechanism, and wherein, preferably, the monitored area includes a warning zone comprising an area peripheral to the danger zone, and when the lifting operation system is operating to move the lifting mechanism and an object or person is detected in the warning zone, a warning alert is provided to a driver or operator of the vehicle, but the functioning of the lifting operation system is not affected.

In one form, the safety system relies on motion detection, the controller processing the received data to determine a change of scene within the area, the change of scene indicative of the presence of an object or person.

The present invention also provides a refuse collection vehicle including the safety system defined in any one of the aspects of the invention set out herein.

The lifting operation system can provide manual control of the lifting mechanism (such that the operator manually controls bin pickup, movement and emptying by way of commands to the system), or can be fully or partially automated, by way of programmed control software. In a fully manual system, the output from the detection system operates to interrupt, prevent or override commands input by the operator. In an automated system, the output from the detection system operates to provide an input to the control program.

The controller of the safety system can be integrated into one or more of the sensors.

The safety system and the lifting operation system can be two separate systems, with operative communication therebetween, or alternatively they can be a single integrated system.

In a third aspect, there is provided a safety system for use with a refuse collection vehicle having a refuse storage body, the system operating to detect the presence of an object or person in the vicinity of the vehicle and communicate with a lifting operation system, wherein the vehicle has a lifting mechanism for engagement with a refuse bin, the lifting operation system operable to move the lifting mechanism between a lowered position at which the bin is on the ground in front of the vehicle and a raised position for discharge of the bin contents into the interior of the refuse storage body, the safety system including:

at least two sensors mounted relative to an external part of the vehicle, able to monitor an area in the vicinity of the vehicle where the lifting mechanism lifts and lowers bins; and a controller operative to receive input data from the at least two sensors and process the data to determine the presence of an object or person, the controller further operative to control functioning of the lifting operation system in accordance with the determination by the controller, wherein each of a first and second of the at least two sensors has a front face, the front face positioned between 80 mm in front of the external part of the vehicle and 30 mm behind the external part of the vehicle.

Each sensor, and particular the front face of each sensor, is thus mounted close to the external part of the vehicle where it is located, and may be mounted behind that external part. This maximises the area monitored, while protecting the sensors from the potential external damage that might occur with substantial external protrusion of the sensors.

The vehicle may be a front loading refuse collection vehicle and the external part of the vehicle a front panel of a front cabin of the vehicle.

In a preferred form, the front face of the sensors is approximately level with the front panel of the vehicle cabin, or more particularly around 2 mm forward thereof.

The front panel may be shaped such that a part of it protrudes forwardly of the front cabin further than other parts, and the first and second sensors are mounted such that their front faces are not positioned further forward than the protruding front part of the front panel.

Generally, it is the central portion of the cabin front panel which protrudes forwardly of the lateral portions, and the sensors are mounted in the lateral portions so as not to protrude further forward than that central portion of the front panel.

In a fourth aspect, there is provided a safety system for use with a refuse collection vehicle having a refuse storage body and a front cabin, the system operating to detect the presence of an object or person in the vicinity of the vehicle and communicate with a lifting operation system, wherein the vehicle has a lifting mechanism for engagement with a refuse bin, the lifting operation system operable to move the lifting mechanism between a lowered position at which the bin is on the ground in front of the vehicle and a raised position for discharge of the bin contents into the interior of the refuse storage body, the safety system including:

at least two sensors mounted relative to an external part of the vehicle, able to monitor an area in the vicinity of the vehicle where the lifting mechanism lifts and lowers bins; and a controller operative to receive input data from the at least two sensors and process the data to determine the presence of an object or person, the controller further operative to control functioning of the lifting operation system in accordance with the determination by the controller, wherein each of a first and second of the at least two sensors is provided in a sensor unit, and each sensor unit is recessed into the external part of the vehicle.

In this way, the sensor units (which can be relatively large modules), are recessed into the external part of the vehicle, rather than being mounted to the surface of the external part. In retrofitting the safety system to a vehicle, this may be done by cutting a body panel to accommodate the sensor units, mounting the sensor units in the recesses so provided, and working the panel parts or additional material to conform the external shaping to the sensor unit, eg. to smoothly abut the sides of the sensor unit and thus avoid abrupt discontinuities in the external shaping.

The recessing of the sensor units allows the sensors to be set back close to the external part of the vehicle, which makes it possible to maximise the area monitored, while protecting the sensors from the potential external damage that might otherwise occur.

The vehicle may be a front loading refuse collection vehicle and the external part of the vehicle a front panel of a front cabin of the vehicle.

In a fifth aspect, there is provided a safety system for use with a refuse collection vehicle having a refuse storage body, the system operating to detect the presence of an object or person in the vicinity of the vehicle and communicate with a lifting operation system, wherein the vehicle has a lifting mechanism for engagement with a refuse bin, the lifting operation system operable to move the lifting mechanism between a lowered position at which the bin is on the ground in front of the vehicle and a raised position for discharge of the bin contents into the interior of the refuse storage body, the safety system including:

one or more sensors mounted on the vehicle, able to monitor an area in the vicinity of the vehicle where the lifting mechanism lifts and lowers bins; and a controller operative to receive input data from the one or more sensors and process the data to determine the presence of an object or person, the controller further operative to control functioning of the lifting operation system in accordance with the determination by the controller, wherein, if an object or person is detected when the lifting mechanism is moving from the lowered position to the raised position, subsequent movement of the lifting mechanism back towards the lowered position is prevented.

The lifting operation system may thus be programmed to that, in this situation, further lowering commands from an operator will not result in movement of the lifting mechanism, irrespective of whether determination of the presence of an object or person has continued.

In an embodiment, the lifting operation system may be selectively overridden to allow further movement towards the lowered position.

If the lifting operation system is overridden in this way, an appropriate warning may be provided to an operator of the lifting operation system, to prompt that further operation be carried out with caution.

The vehicle's control system may therefore involve two modes, a normal mode in which determination of the presence of an object or person by the controller controls functioning of the lifting operation system, and an override mode in which the determination does not control functioning of the lifting operation system, and it may be selectively switched from the first mode to the second mode by an operator in the event the detection system operates to automatically prevent operator control of the lifting mechanism.

In a sixth aspect, there is provided a safety system for use with a refuse collection vehicle having a refuse storage body, the system operating to detect the presence of an object or person in the vicinity of the vehicle and communicate with a lifting operation system, wherein the vehicle has a lifting mechanism for engagement with a refuse bin, the lifting operation system operable to move the lifting mechanism between a lowered position at which the bin is on the ground in front of the vehicle and a raised position for discharge of the bin contents into the interior of the refuse storage body, the safety system including:

one or more sensors mounted on the vehicle, able to monitor an area in the vicinity of the vehicle where the lifting mechanism lifts and lowers bins; and a controller operative to receive input data from the one or more sensors and process the data to determine the presence of an object or person, the controller further operative to control functioning of the lifting operation system in accordance with the determination by the controller, wherein, if an object or person is detected when the lifting mechanism is moving from the raised position to the lowered position, further movement of the lifting mechanism in that direction is prevented, but movement back towards the raised position is not prevented.

In this way, when the lifting mechanism is lowering a bin to the ground and an object or person is detected in a danger zone, the operation is automatically stopped, ie. further commands by the operator to lower the lifting mechanism no longer have effect. However, a command to lift the lifting mechanism will have effect, allowing a bin or the lifting mechanism to be immediately raised if required.

In an embodiment, the lifting operation system may be selectively overridden to allow further movement to the lowered position.

If the lifting operation system is overridden in this way, an appropriate warning may be provided to an operator of the lifting operation system, to prompt that further operation be carried out with caution.

The vehicle's control system may therefore involve two modes, a normal mode in which determination of the presence of an object or person by the controller controls functioning of the lifting operation system, and an override mode in which the determination does not control functioning of the lifting operation system, and it may be selectively switched from the first mode to the second mode by an operator in the event the detection system operates to automatically prevent operator control of the lifting mechanism.

In accordance with the fifth or sixth aspects of the invention, the vehicle may be a front loading refuse collection vehicle and the one or more sensors mounted to a front cabin of the vehicle.

In an embodiment, the safety system includes at least two sensor units, which may be mounted to respective side portions of the front of the cabin of the vehicle, to monitor the area in front of the vehicle.

In vehicles employing a mechanism comprising lifting forks mounted to lifting arms, the lifting forks for engagement with the bin, the movement control of the invention may be applied to the lifting arms, the lifting forks, or both.

The safety system may rely on motion detection, the controller processing the received data to determine a change of scene within the area, the change of scene indicative of the presence of an object or person.

In a seventh aspect, there is provided a safety system for use with a refuse collection vehicle having a refuse storage body and a front cabin, the system operating to detect the presence of an object or person in the vicinity of the vehicle and communicate with a lifting operation system, wherein the vehicle has a lifting mechanism for engagement with a refuse bin, the lifting operation system operable to move the lifting mechanism between a lowered position at which the bin is on the ground in front of the vehicle and a raised position for discharge of the bin contents into the interior of the refuse storage body, the safety system including:

at least one sensor unit arranged to monitor an area in the vicinity of the vehicle, the monitored area including (i) a danger zone through which a bin moves when the lifting mechanism moves between the lowered position and the raised position and (ii) a warning zone comprising an area peripheral to the danger zone;

a controller operative to receive input data from the at least one sensor unit and process the data to determine the presence of an object or person, the controller further operative to control functioning of the lifting operation system in accordance with the determination by the controller of object or person in the danger zone, wherein, when the lifting operation system is operating to move the lifting mechanism and an object or person is detected in the warning zone, a warning alert is provided to a driver or operator of the vehicle, but the functioning of the lifting operation system is not affected.

The warning alert may be provided if the lifting mechanism is moving from the raised position towards the lowered position, or alternatively may be provided irrespective of the direction of movement.

In an eighth aspect, there is provided a safety system for use with a refuse collection vehicle having a refuse storage body and a front cabin, the system operating to detect the presence of an object or person in the vicinity of the vehicle and communicate with a lifting operation system, wherein the vehicle has a lifting mechanism for engagement with a refuse bin, the lifting operation system operable to move the lifting mechanism between a lowered position at which the bin is on the ground in front of the vehicle and a raised position for discharge of the bin contents into the interior of the refuse storage body, the safety system including:

at least one sensor unit arranged to monitor an area in the vicinity of the vehicle where the lifting mechanism lifts and lowers bins; and a controller operative to receive input data from the at least one sensor unit and process the data to determine the presence of an object or person, the controller further operative in a first, normal mode to control functioning of the lifting operation system in accordance with the determination by the controller, the control of functioning of the lifting operation system being such that, in certain operations, if an object or person is detected in the monitored zone, movement of the lifting mechanism from the raised position to the lowered position is prevented, wherein the system can be selectively switched into a override mode to allow further movement towards the lowered position, and wherein the system automatically switches back into the normal mode at a prescribed position of the lifting mechanism.

In this way, if normal operation of the lifting operation system has been selectively overridden by the operator, it is automatically resumed on attainment of the prescribed position. The prescribed position may be when the lifting mechanism has reached the lowered position, or may be when the lifting mechanism has reached the first lowered position and lifted again to a position where the bin has passed through and out of the monitored area.

In a ninth aspect, there is provided a safety system for use with a refuse collection vehicle having a refuse storage body and a front cabin, the system operating to detect the presence of an object or person in the vicinity of the vehicle and communicate with a lifting operation system, wherein the vehicle has a lifting mechanism for engagement with a refuse bin, the lifting operation system operable to move the lifting mechanism between a lowered position at which the bin is on the ground in front of the vehicle and a raised position for discharge of the bin contents into the interior of the refuse storage body, the safety system including:

at least one sensor unit arranged to monitor an area in the vicinity of the vehicle where the lifting mechanism lifts and lowers bins; and a controller operative to receive input data from the at least one sensor unit and process the data to determine the presence of an object or person, the controller further operative to control functioning of the lifting operation system in accordance with the determination by the controller, wherein the functioning of the lifting operation system is not affected by the safety system when the lifting mechanism is moving a bin such that the bin is within the monitored area.

In this way, the normal operation of the vehicle is not affected when the bin is within the field of view of the sensor unit(s), to preclude the situation of the safety system detecting the bin as a person or object and thus interrupting movement of the lifting mechanism.

The determination of whether the lifting mechanism is moving a bin within the monitored area may be effected in accordance with the position of the lifting mechanism, eg. as determined by a suitable position monitoring system.

When the bin is determined to be within the monitored area, signals from the safety system controller to the lifting operation system may be ignored. Alternatively, the controller may be configured not to send such control signals, or its normal operation may be disabled in another way.

In a tenth aspect, there is provided a safety system for use with a refuse collection vehicle having a refuse storage body and a front cabin, the system operating to detect the presence of an object or person in the vicinity of the vehicle and communicate with a lifting operation system, wherein the vehicle has a lifting mechanism for engagement with a refuse bin, the lifting operation system operable to move the lifting mechanism between a lowered position at which the bin is on the ground in front of the vehicle and a raised position for discharge of the bin contents into the interior of the refuse storage body, the safety system including:

at least one sensor unit arranged to monitor an area in the vicinity of the vehicle where the lifting mechanism lifts and lowers bins; and a controller operative to receive input data from the at least one sensor unit and process the data to determine the presence of an object or person, the controller further operative to control functioning of the lifting operation system in accordance with the determination by the controller, wherein the safety system is arranged to be disabled or turned off when the vehicle is moving.

In a preferred form, the vehicle has a means for determining whether it is moving, and the safety system is disabled or turned off in response to the vehicle movement determination means indicating that the vehicle is moving.

In this way, when locomotion of the vehicle is detected, the sensor unit is automatically disabled. This prevents the unit illuminating when the vehicle is moving, which could present a danger in respect of operation in traffic or in compliance with road regulations.

The safety system may include a light transmitting module to emit light and a receiving module to receive reflected light, wherein the light transmitting module is disabled or switched off when the vehicle is moving.

The vehicle may be a front loading refuse collection vehicle and the external part of the vehicle a front panel of a front cabin of the vehicle.

The safety system may include at least two sensor units, which may be mounted to respective sides of the front of the cabin of the vehicle, to monitor the area in front of the vehicle.

In an eleventh aspect, there is provided a safety system for use with a refuse collection vehicle having a refuse storage body and a front cabin having a longitudinal centreline, the system operating to detect the presence of an object or person in the vicinity of the vehicle and communicate with a vehicle lifting operation system, wherein the vehicle is a front loading refuse collection vehicle having a lifting mechanism for engagement with a refuse bin, and wherein the lifting operation system is operable to move the lifting mechanism between a lowered position at which the bin is on the ground in front of the vehicle and a raised position for discharge of the bin contents into the interior of the refuse storage body, the safety system including:

at least three sensors positioned on the front of the cabin, able to monitor an area substantially in front of the vehicle; and a controller operative to receive input data from the at least three sensors and process the data to determine the presence of an object or person in the area, the controller further operative to control the functioning of the lifting operation system in accordance with the determination by the controller.

In an embodiment, two of the sensors are, respectively, mounted close to the sides of the front of the cabin, and at least one sensor is mounted at or close to the longitudinal centreline.

Such a system can provide excellent coverage of substantially the whole risk area in front of the vehicle, minimising any blind spots between sensors and therefore enabling a very high degree of operation safety.

The system of the invention is therefore arranged to determine the presence of a person or object in a particular zone of interest, the output of this determination being used as an input to the vehicle's lifting operation system, which controls the movement of the bin lifting and lowering mechanism.

The system may, in one form, comprise a motion detector system to determine movement in the zone of interest, such movement interpreted as indicating the presence of a person or object. Alternatively the system may be arranged to map the zone of interest, any artefact therein being interpreted as indicating the presence of a person or object.

The features described with respect to one aspect of the invention can equally be applied, where suitable, to any other aspect of the invention.

Reference in this specification to 'one embodiment' or 'an embodiment' means that a particular feature, structure, or characteristic described in connection with the embodiment is included in at least one embodiment of the present invention. Thus, where phrases such as 'in one embodiment' or 'in an embodiment' appear, they do not necessarily refer to the same embodiment. Furthermore, the particular features, structures, or characteristics described herein may be combined in any suitable manner in one or more combinations.

BRIEF DESCRIPTION OF THE DRAWINGS

In order that the present invention can be more readily understood, reference will now be made to the accompanying drawings which illustrate a preferred embodiment of the invention and wherein.

DETAILED DESCRIPTION OF PREFERRED EMBODIMENTS

Figure 1:
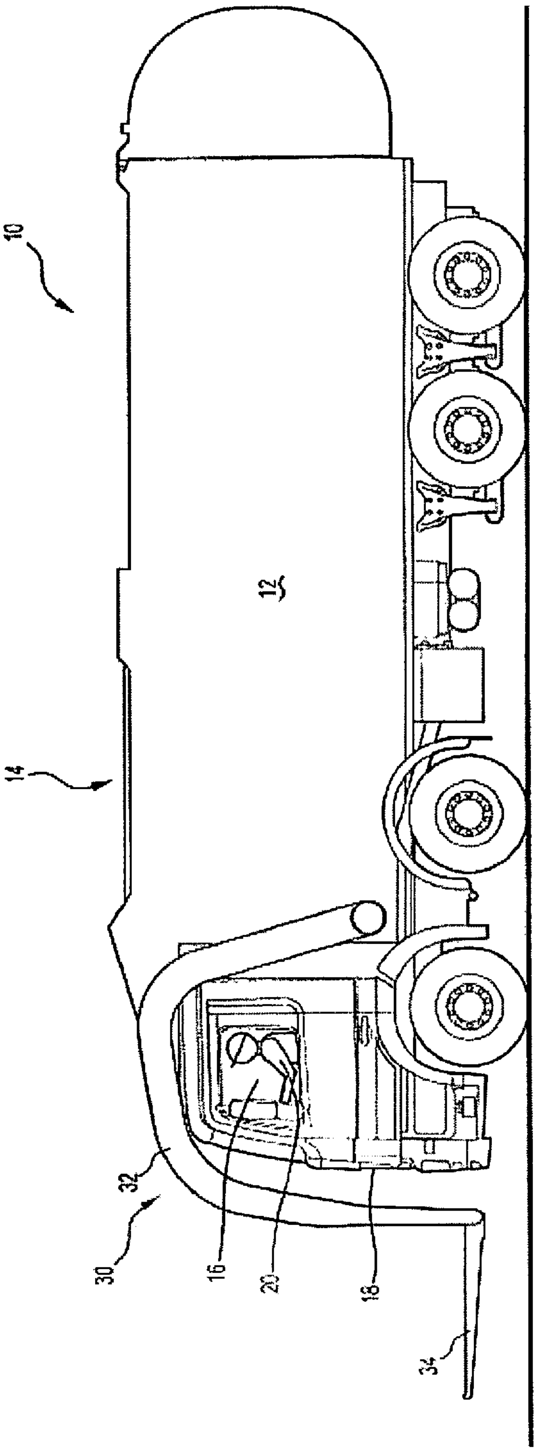
FIG. 1 shows a side view of a conventional front-end loading refuse collection vehicle.

The refuse collection vehicle 10 of FIG. 1 includes a refuse storage body 12 and a cabin 16 at the front. Towards its forward end, refuse storage body 12 has a top opening 14, accessible by way of an opening hatch or door(s).

The front panel of cabin 16 is shown at 18, and a vehicle driver/operator is shown at 20.

A lifting mechanism 30 provides the means by which refuse bins can be engaged, lifted, raised and bought over the top of cabin 16 to be emptied into refuse storage body 12 by way of opening 14. Lifting mechanism 30 operates under control of a lifting control system operated by operator 20 manipulating command controls in cabin 16, eg. by moving a control joystick or other suitable interface means.

The lifting system comprises a pair of lifting arms 32, each pivotally connected to a side of the lower front part of the vehicle body front, and a pair of lifting forks 34. The movement of lifting arms 32 and lifting forks 34 is realised by operation of hydraulic cylinders (not shown) controlled by the lifting control system. The lifting control system is configured to move lifting arms 32 between a lowered position (corresponding to a bin positioned on the ground) to a raised position (corresponding to the bin positioned over vehicle top opening 14, rotation of lifting forks 34 about a lateral axis allowing control of the orientation of the bin. Commonly, operator 20 controls the operation by manipulating a joystick, movement in the X direction controlling the movement of lifting arms 32, movement in the Y direction controlling the rotation of lifting forks 34.

When emptying a bin 40, the vehicle driver/operator positions vehicle 10 with bin 40 positioned forwardly thereof, and then uses the vehicle and lifting control system to engage lifting forks 34 with the bin (by way of fork slots 42 provided in the outer side walls of the bin), and then to raise lifting arms 32. This lifts bin 40 in a generally arcuate path up over cabin 16 and brings it to a position over top opening 14. The lifting control system operates during this travel to rotate lifting forks 34 in relation to lifting arms 32 as required to control the orientation of bin 40 as required, and then to invert the bin to dump its contents into refuse storage body 12 of the vehicle once lifting arms 32 have reached the raised position. Bin 40 is then returned to the ground by lowering lifting arms 32 to the lowered position in a reverse operation to the raising operation, and lifting forks 34 then withdrawn from slots 42.

Figure 2:
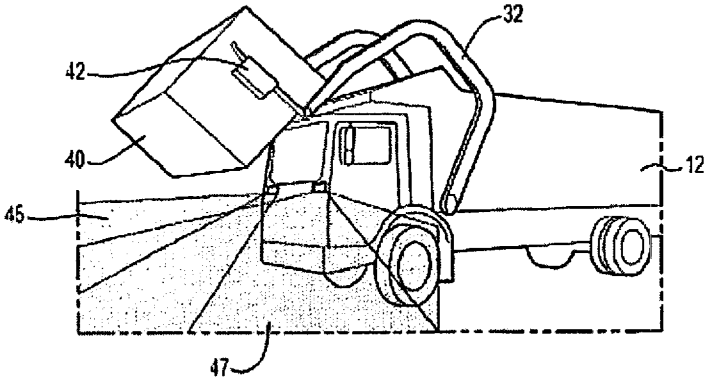
FIG. 2 is a diagrammatic isometric view of the vehicle of FIG. 1 fitted with a detection system in accordance with an embodiment of the present invention, comprising two sensor units.
Figure 3:
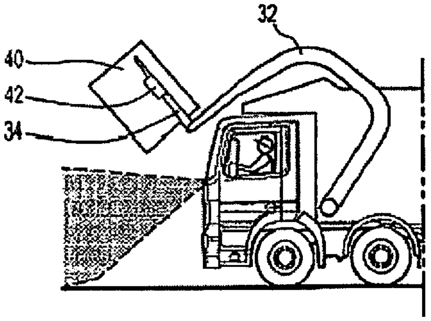
FIG. 3 is a diagrammatic side view.

As shown diagrammatically in FIGS. 2-4, vehicle 10 is provided with sensor units 44, 46, each mounted to the front panel 16 below the windscreen, one mounted near the left hand side and one mounted near the right hand side of cabin 16. Each sensor unit 44, 46 includes an infrared illuminator and a sensor, arranged to monitor sensed volumes 45, 47, which covers the space generally in front of vehicle 10. Sensor units 44, 46 form part of a detection system to sense objects and persons in the vicinity of the front of vehicle 10 who may be at risk from movement of lifting mechanism 30 or bin 40. The detection system is operatively interconnected with the lifting control system, as explained in further detail below.

Figure 4:
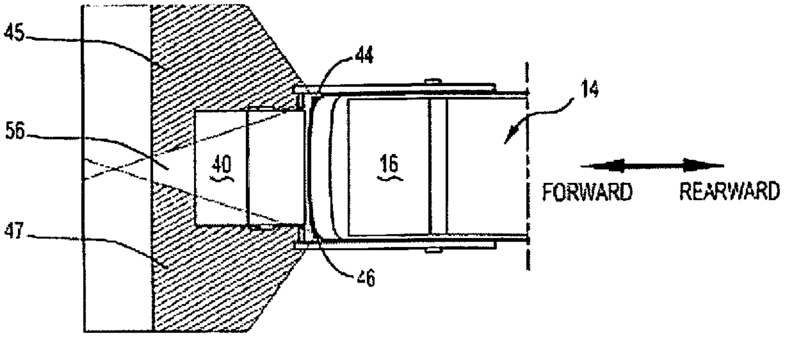
FIG. 4 is a diagrammatic plan view.

In the view shown in FIG. 4, each sensor unit 44, 46 is shown directed generally at an angle to the longitudinal centreline of the vehicle, to cover a total area subtending around 130°. Whilst this arrangement provides a wide field of view, it leaves unmonitored a triangular blind spot area 56, in the centre of the region where the bin is raised and lowered.

Figure 5:
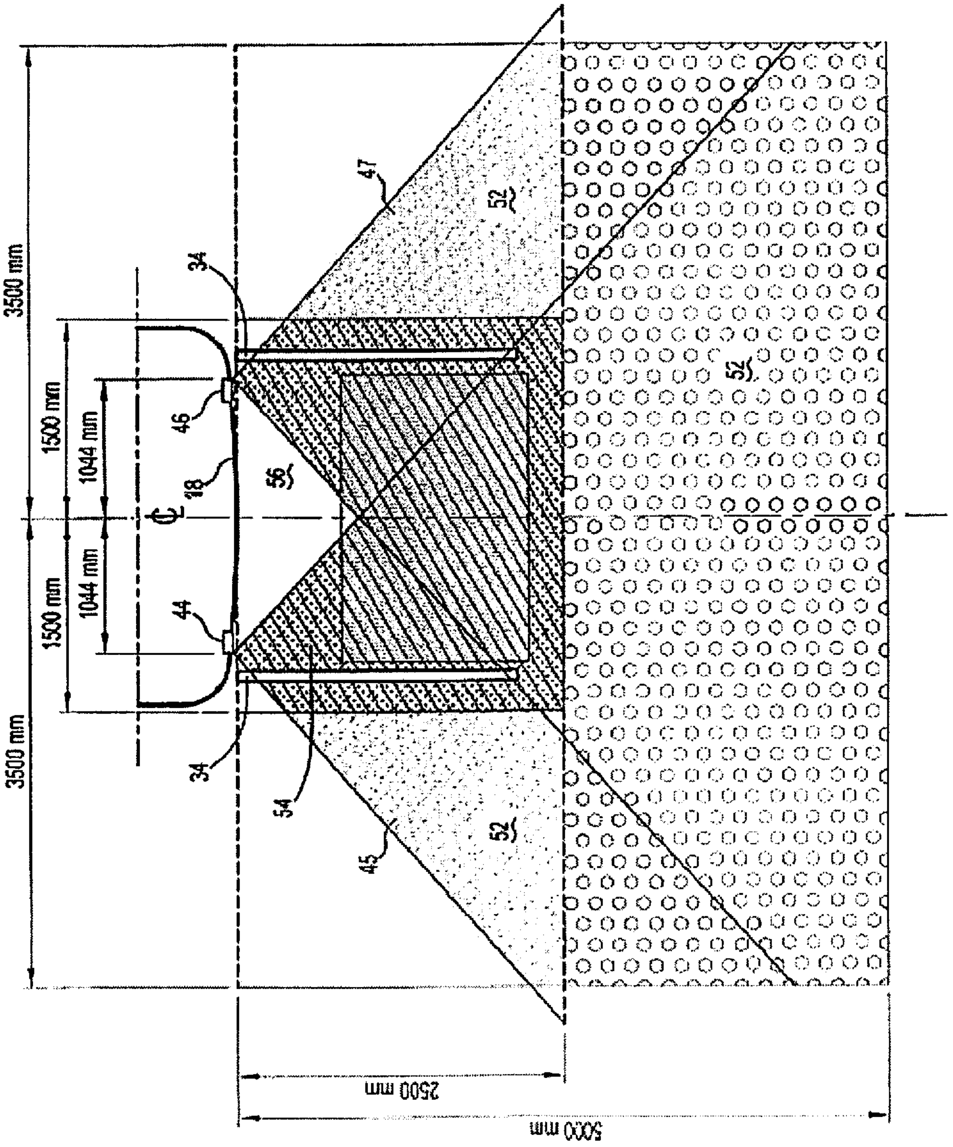
FIG. 5 is a diagrammatic plan view of the detection zones monitored by the detection system.

The variant shown in FIG. 5 directs sensor units 44 and 46 generally forwardly (ie. in line with the centreline of the vehicle), which reduces blind spot area 56 significantly, while maintaining a suitably wide field of view. When reference is made in this specification to the vehicle's centreline, it will be understood that this refers to the centreline as seen in plan view (eg. in FIG. 5), the centreline thus representing a vertical plane aligned in the forward-rearward direction.

Sensor units 44, 46 are used to monitor movement within sensed areas 45, 47, so that the detection system is able to determine that an object or person has entered the area in front of vehicle 10. In accordance with the logic of the detection system, the sensed areas are divided into a first, central zone 54 and a second, peripheral zone 52. In the embodiment illustrated, the first zone, which will be referred to as the Danger Zone, embraces the area directly in front of the front of cabin 16 for a distance of 2500 mm in front of the front panel 18 and a width of 3000 mm, which fully encompasses the lifting forks 34 and an engaged bin in the lowered position. The second zone, which will be referred to as the Warning Zone, embraces the area lateral of Danger Zone 54 up to a distance of 3500 mm from the vehicle centreline, and to a forward boundary 5000 mm in front of the front panel 18 of cabin 16. The Danger Zone and the Warning Zone combine to form a Monitored Zone.

The Warning Zone thus provides an 'early warning' alert to operator 20 if a person or object approaches the bin lifting/lowering area either from a lateral or from a forward direction.

It will be understood that the above dimensions of the different zones is provided by way of example only, and will of course be selected as appropriate for the particular intended operation and the particular vehicle and bin size and type.

Sensor units 44, 46 act as motion detectors, to provide input for the detection of an object or person in the Monitored Zone, and appropriate logic in the detection system (as described below) provides input to the lifting control system to determine the response to be taken.

The position of bin 40 is based on a determination of the position of lifting arms 32 relative to the lowered position, and on the position of lifting forks 34. The lifting system includes rotational position sensors mounted on lifting arms 32 and lifting forks 34, used to feedback position to the lifting control system. Alternatively, position could be determined by inclinometers mounted on the arms and forks, or in accordance with the linear movement of the hydraulic cylinders that drive lifting arms 32 and lifting forks 34.

If lifting mechanism 30 is lifting or lowering bin 40 between the lowered position and the position at which bin 40 clears the sensed volume 45, 47 (ie. around the position at which the bottom of the bin is level with the bottom of the windscreen of cabin 16), the detection system is disabled, or signals provided by the detection system do not affect the normal functioning of the lifting control system. Otherwise, the movement of the bin would be interpreted as the presence of an object or person, which would result in the lifting control system interrupting operation.

Outside this bin movement range, the lifting control system is configured as follows.

Lowering Operation

When arms 32 are lowering (under command of operator 20), if a moving object is detected in Warning Zone 52 a suitable alert is provided to the operator. This is an audible alarm (slow beep), accompanied by a visual warning such as a flashing light, as well as a warning message on the in-cabin screen display ('Object Detected—Proceed With Caution'). This thus prompts the operator to pay attention to the general area in front of the vehicle in continuing the lowering operation. However, the continued lowering operation is not interrupted. If the moving object is no longer detected on the Warning Zone, the alert ceases.

When arms 32 are lowering (under command of operator 20), if a moving object is detected in Danger Zone 54 further downward movement of arms 32 and forks 34 is immediately stopped. This is accompanied by an audible alarm (fast beep) as well as suitable visual alerts (including a warning message on the operator's screen display ('Object Detected—Machine Stopped. Check Work Zone'). Any further lowering operation is disabled, meaning that when the operator inputs a command to lower bin 40, the lowering operation is locked out. However, the system is configured to allow the operator to lift arms 32 and/or forks 34 in such a situation, to allow them to be moved immediately if necessary to clear a hazard.

To lower lifting arms 32 under these circumstances, the operator is required to actively override the system, eg. by actuating a manual override control on a control panel in cabin 16. This has the effect of disabling the detection system. The operator is thus prompted to very carefully check the area in front of the vehicle before taking this override action and continuing the lowering operation with caution.

In such an operation, once lifting arms 32 have returned to the lowered position, the operator override automatically ceases, ie. the detection system can reactivate, to detect any moving objects during the next operation.

Lifting Operation

When arms 32 are lifting (under command of operator 20), if a moving object is detected in Warning Zone 52 a suitable alert is provided to the operator. This comprises audible/visual alerts discussed above with regard to the lowering operation (slow beep). This prompts the operator to pay attention to the general area in front of the vehicle in continuing the lifting operation. However, the continued lifting, bin emptying and lowering operation is not interrupted. If the moving object is no longer detected on the Warning Zone, the alert ceases.

When arms 32 are lifting (under command of operator 20), if a moving object is detected in Danger Zone 54 a suitable alert is likewise provided to the operator. This comprises audible/visual alerts discussed above with regard to the lowering operation (fast beep and appropriate on-screen warning message), which prompts the operator to pay careful attention to the general area in front of the vehicle. The continued lifting and bin emptying operation is not interrupted.

However, following detection of a moving object in Danger Zone 54, a subsequent lowering operation is disabled (and appropriate message displayed to the operator), meaning that when the operator attempts to lower bin 40, the lowering operation (ie. lowering of arms 32 or forks 34) in such a situation is locked out.

Subsequent Lowering Operation

To lower lifting arms 32 or lifting forks 34 under these circumstances, the operator is required to actively override the system, eg. by actuating a manual override control on a control panel in cabin 16. This has the effect of disabling the detection system (or, more accurately, signals received from the detection system are ignored, meaning that they do not affect the functioning of the lifting control system). The operator is prompted to carefully check the area in front of the vehicle before taking this override action and performing the lowering operation.

In such an operation, once lifting arms 32 have returned to the lowered position, the operator override automatically ceases, ie. the functioning of the detection system can reactivate.

Figure 6:
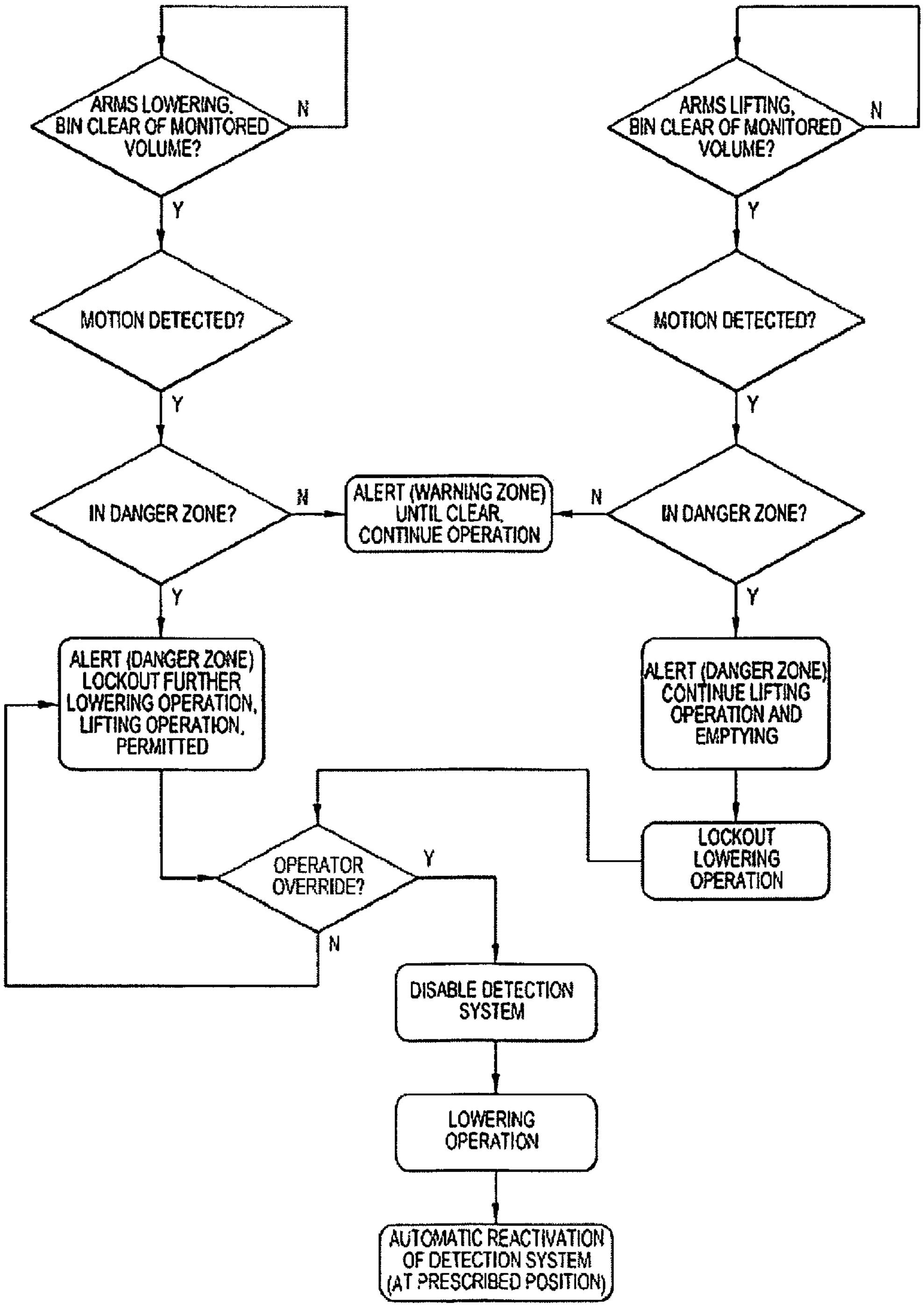
FIG. 6 is a flow diagram illustrating the logic flow of an implementation of the invention.

The logic of the above operations is shown schematically in the flow diagram of FIG. 6.

It will thus be understood that the detection system of the invention is programmed to identify any scene change caused by movement within the Monitored Zone and, if this movement is detected in Danger Zone 54 and the bin lifting system is in operation either to lift or to lower the bin lifting mechanism 30, to lockout any further lowering operation. Unless and until the operator overrides this lockout (by temporarily disabling the detection system), no further lowering operation is possible. This is an important feature of the present invention, as relying (for example) on the detection system recognising that movement has ceased in the Danger Zone, and then automatically resuming operation, or relying on the detection system only during lowering operations, could lead to risk. Very importantly, this avoids the risk that the bin lowering operation could be conducted or completed if a pedestrian were to enter the Danger Zone during a lifting or a lowering operation and then pass into blind spot area 56.

Importantly, in order to provide maximum protection, the position of the sensors of sensor units 44, 46 is critical. The sensors need to be positioned such that the Danger Zone and Warning Zone are optimised. To achieve this, the sensors should be sufficiently spaced apart, preferably substantially across the full width of the front of the vehicle. The applicant has determined this as a minimum distance of 800 mm from the centreline of vehicle 10, preferably greater than 900 mm therefrom, more preferably more than 950 mm therefrom, and yet more preferably more than 1000 mm therefrom. This provides a very wide field of view, and importantly avoids or minimises the undesirable creation of blind spot areas at the corners of the front of the vehicle, which could give rise to a significant risk in the case of a pedestrian who might approach the Danger Zone around the right or left front corner of the vehicle.

Stated in another way, the sensors should be sufficiently close to the lateral sides 17 of cabin 16 of vehicle 10 to avoid the creation of the blind spot areas discussed above. The applicant has determined that each sensor should be within at least 300 mm of the lateral side 17 of vehicle cabin 16, preferably within 200 mm therof, and ideally within about 120 mm thereof.

Figure 7:
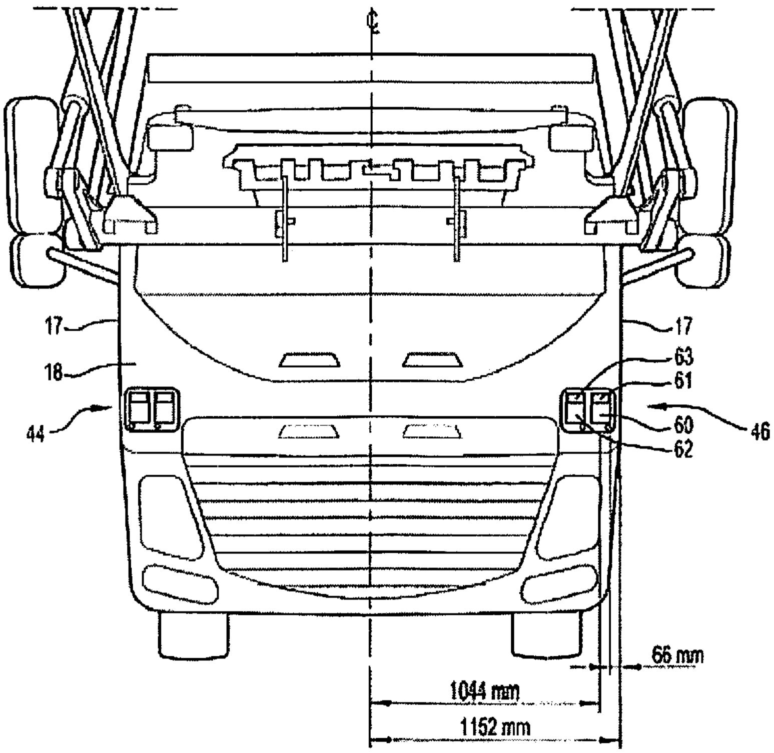
FIG. 7 is a front view of the vehicle of FIG. 1, showing the positioning of the sensor units.

FIGS. 5 and 7 set out the dimensions and spacings discussed above, with reference to an embodiment of the invention employed to a refuse collection vehicle comprising a Volvo FM4 cab chassis.

The reader will understand that when discussing the position of a sensor, this refers to the position of the centre of the front lens where light is collected (see reference 61 in FIG. 7, and further discussion below).

Further, in order to provide maximum protection, each sensor unit should be mounted to be close to the front panel 18 of the vehicle cabin 16. The applicant has determined that the front face of the sensor unit (which is generally just forward of the light collecting lens of the sensor) should be positioned in the range between 80 mm in front to 30 mm behind front panel 18. In the Volvo cab chassis embodiment, this was around 2 mm forward of the front panel.

Preferably, the sensor units should be recessed into front panel 18 such that the front face of the sensor unit does not extend further than the front-most extent of panel 18 across the front of cabin 16 (generally, at the centreline of the cabin). As well as maximising the sensed zones, this assists in protecting the sensor units from damage in normal use.

In the embodiment tested by the applicant, when viewed from the front of the vehicle, then, the sensor units are recessed into the front panel of the cabin, positioned above the headlights of the vehicle and close to the lateral sides of the cabin, with each sensor approximately 1044 mm from the vehicle longitudinal centreline (see FIGS. 5 and 7).

Further, it will be understood that the mounting of the sensor units may include mounting fixtures such as vibration dampers or mechanisms to withdraw the sensor units when the detection system is not in use.

Figure 8:
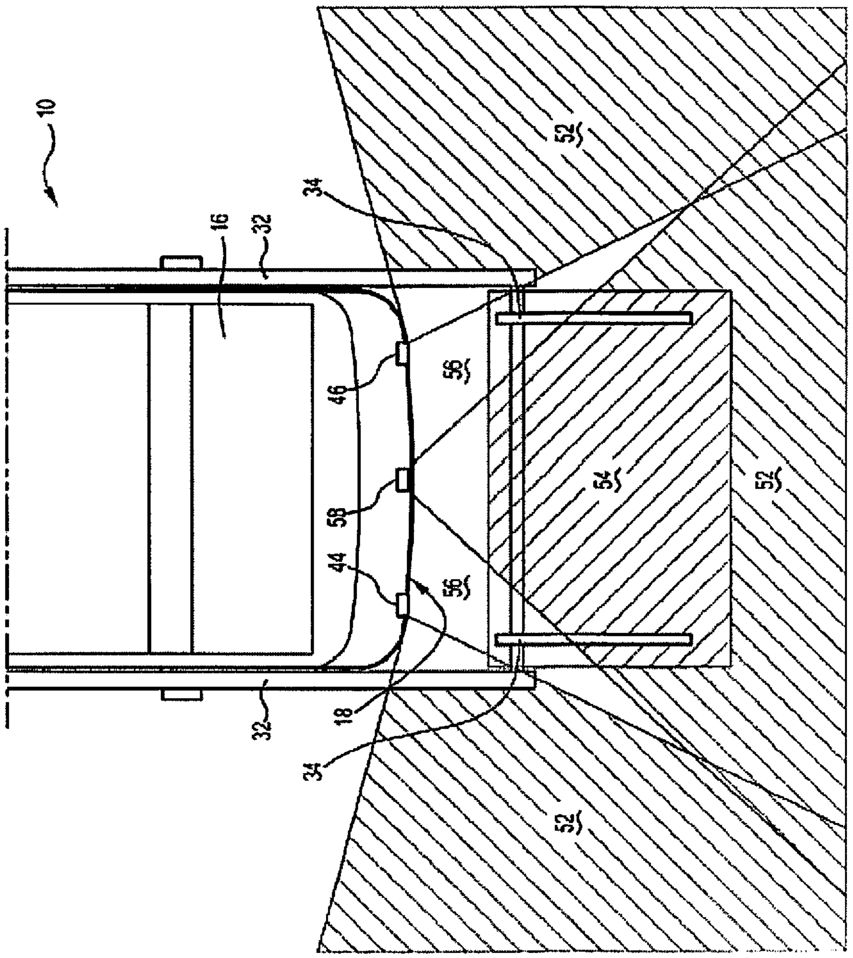
FIG. 8 is a diagrammatic plan view of the detection zones of a further embodiment of the invention, comprising three sensor units.

In an alternative to the system described above, the detection system of the invention may employ more than two sensor units. For example, the system may use three sensor units, as diagrammatically shown in FIG. 8, in order to cover a greater overall area. In this arrangement, a sensor unit 44, 46 is mounted on each side of the front of cabin 16, and a third unit 58 is mounted centrally of the front of cabin 16. This provides three sensed areas 45, 47 and 59. In this arrangement, sensor units 44 and 46 are angled to each cover a lateral area rearward of the front of the vehicle cabin, while central sensor unit 58 embraces the region including the Danger Zone 54.

The sensor units used in the detection system tested by the applicant were active infrared units. The sensors were 3D Smart Sensors supplied by IFM Efector Pty Ltd (part no. 03M151), each with an associated infrared illumination module (part no. 03M950). These devices provide 3D infrared imaging, and work by calculating the phase shift of the transmitted and received IR light across the field of view, producing a point cloud of the area monitored. As will be understood, each sensor unit could equally be a single integrated module, comprising both transmitter and receiver.

The sensor module 60 (with its sensor 61) and the illuminator module 62 (with its illuminator 63) are mounted together in a robust protective housing, each module having a replaceable transparent front face (see sensor unit 46 in FIG. 7). The unit features a supply connection which provides power as well as connection of the digital and analogue outputs, and also features an Ethernet connection to communicate output data via industrial Ethernet networks (TCP/IP and EIP).

The output from sensors 61 is processed by a 3D data processing algorithm in an onboard processor, to model the volume in front of the refuse vehicle, determine the Danger Zone and Warning Zone (see FIG. 5), and determine motion in each zone in accordance with programmed parameters. The onboard processor passes commands to the vehicle's lifting control system, and also passes commands to the sensor units (eg. to switch off the illuminator modules and/or the sensor modules, as discussed further below). It will be understood that the commands passed on from the onboard processor to the lifting control system may simply be limited to data signals indicating (a) that motion is detected in the Warning Zone and (b) that motion is detected in the Danger Zone, the absence of a signal indicating that no motion is detected. Any decisions based on that information may then be made by the vehicle's lifting control system.

It will be understood that, although it is preferred that the detection system of the invention operates as a motion detection system, other modes are possible. For example, the processor of the detection system may be configured to interpret any IR reflection in the particular zone of interest (ie. the detection of any artefact in that zone) as indicating the presence of a person or object. Alternatively, the sensors may be proximity sensors, or any other suitable type of sensor.

Figure 9:
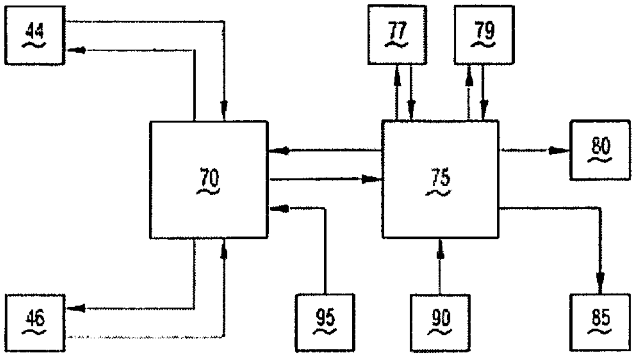
FIG. 9 is a schematic diagram of the components of the detection system and lifting control system in accordance with an implementation of the invention.

Illustrated in FIG. 9 are the functional units of the vehicle's detection and control system, and their interconnection. The onboard processor 70 is operatively connected with sensor units 44 and 46, and with lifting control system 75. Units 77 and 79 denote the control systems for lifting arms 32 and lifting forks 34. Unit 80 denotes the in-cabin screen display, while unit 85 denotes the provision of other alerts to operator 20. Unit 90 denotes the operator's command input control system (eg. comprising a joystick, override control, etc), while unit 95 denotes the control system responsive to vehicle locomotion (see below).

As the skilled reader will understand, the onboard processor of the detection system may be provided as a separate unit, or may be built into the sensor units. Further, the onboard processor of the detection system and the vehicle's lifting control system could be provided in a single integrated computer system, rather than as two separate programmed controllers.

The output of the sensors may optionally be displayed as an image on an in-cabin display, with any moving objects highlighted to increase visibility. Further, the data may be recorded for future analysis if required. The motion detector systems are configured to automatically turn on when the bin lift control system is activated.

The detection system is configured to automatically switch on when the vehicle is started, hence turning on both the sensor and illuminator modules 60, 62 ready for use. When movement of the vehicle is detected (in accordance with measured speed of the wheels) the system automatically switches off the detection system (via controller 95), to ensure compliance with road safety regulations which prohibit forward-facing red lights on moving vehicles. When the vehicle comes to a halt, the detection system only switches on once again when the lifting control system is activated. It will be understood that 'switching off' and 'switching on' the detection system in response to locomotion may involve turning off just the illuminator modules 62, or may involve turning off the whole detection system (ie. including the sensor modules).

The detection system of the invention can be retrofitted to existing refuse collection vehicles.

Whilst the above embodiment concerns application of the invention to a front loader refuse collection vehicle, it will be understood that in many aspects the invention can equally be applied to other types of vehicle, and in particular to side loading refuse collection vehicles. Aspects described above which may be applied to side loader vehicles include: the projection of the sensors from the body of the vehicle; the recessing of the sensor units into the sides of the vehicle; the locking out of a subsequent lowering operation if an object or person is detected in a particular zone during a bin raising operation; the ability for a lifting operation if an object or person has been detected in a particular zone during a bin raising operation (although a lowering operation is locked out); the reactivation of the detection system during operation once a bin has cleared the sensed zone; the automatic interruption of the detection system when the vehicle moves; and the use of three or more sensors.

The above description is provided by way of illustration only, and it will be understood that the broad scope and ambit of the invention embrace all modifications and variations thereto as would be apparent to persons skilled in the art.

Throughout the description and claims of this specification the word 'comprise' and variations of that word such as 'comprises' and 'comprising', are not intended to exclude other additives, components, integers or steps.

The invention claimed is:

1. A safety system for use with a refuse collection vehicle having a refuse storage body, the system operating to detect the presence of an object or person in the vicinity of the vehicle and communicate with a lifting operation system, wherein the vehicle has a lifting mechanism for engagement with a refuse bin, the lifting operation system operable to move the lifting mechanism between a first, lowered position at which the bin is on the ground in front of the vehicle and a second, raised position for discharge of the bin contents into the interior of the refuse storage body, the safety system including:

one or more sensors mounted on the vehicle able to monitor an area in the vicinity of the vehicle where the lifting mechanism lifts and lowers bins; and a controller operative to receive input data from the one or more sensors and process the data to provide a determination of the presence of an object or person, the controller further operative to control functioning of the lifting operation system in accordance with the determination by the controller, wherein, when an object or person is detected when the lifting mechanism is moving from said first, lowered position to said second, raised position, the controller prevents subsequent movement of the lifting mechanism towards said first, lowered position but does not prevent further movement toward the second, raised position.

2. A refuse collection vehicle equipped with the safety system of claim 1, having at least two said sensors mounted on the vehicle able to monitor an area in the vicinity of the vehicle where the lifting mechanism lifts and lowers bins, wherein the vehicle has a front cabin with two opposed sides defining right and left lateral extent of the cabin, each of a first and a second of said at least two sensors being positioned at a spacing of less than 300 mm from a respective side of the cabin.

3. A refuse collection vehicle equipped with the safety system of claim 1, having at least two said sensors mounted on the vehicle able to monitor an area in the vicinity of the vehicle where the lifting mechanism lists and lowers bins, wherein each of a first and a second of said at least two sensors has a front face, the front face having a position which is in the range of between 80 mm in front of an external part of the vehicle and 30 mm behind said external part of the vehicle.

4. A refuse collection vehicle equipped with the safety system of claim 1, having at least two said sensors mounted on the vehicle able to monitor an area in the vicinity of the vehicle where the lifting mechanism lifts and lowers bins, wherein each of a first and a second of said at least two sensors is provided in a sensor unit, and each sensor unit is recessed into the external part of the vehicle.

5. A refuse collection vehicle equipped with the safety system of claim 4, wherein the vehicle is a front loading refuse collection vehicle and the external part of the vehicle is a front panel of the vehicle.

6. The refuse collection vehicle of claim 5, wherein the front panel is shaped such that a part of it protrudes forwardly of the front cabin further than other parts, and the first and second sensors are mounted such that their front faces are not positioned further forward than the protruding front part of the front panel.

7. The safety system of claim 1, wherein the controller can be selectively switched into an override mode to allow further movement towards said first, lowered position.

8. The safety system of claim 1, configured to be disabled or turned off when the vehicle is moving.

9. A refuse collection vehicle equipped with the safety system of claim 1, having at least three said sensors mounted on the vehicle able to monitor an area in the vicinity of the vehicle where the lifting mechanism lifts and lowers bins, the vehicle having a longitudinal centerline, wherein two of the sensors are, respectively, mounted on the sides of the front of the cabin, and at least one sensor is mounted centrally on the front of the cabin.

10. The safety system of claim 1, including a motion detector, wherein the controller is configured to process the received input data to determine a change of scene within the area, the change of scene indicative of the presence of an object or person.

11. A refuse collection vehicle equipped with the safety system of claim 1, having at least two said sensors mounted on the vehicle able to monitor an area in the vicinity of the vehicle where the lifting mechanism lifts and lowers bins, wherein the vehicle has a longitudinal centerline and a first and a second of the at least two said sensors are each spaced at least 800 mm from said longitudinal centreline.

12. The safety system of claim 7, wherein the system is configured to provide an audible alarm and a visual alert to an operator to provide a warning to an operator of the lifting operation system if the override mode is selected, to prompt that further operation be carried out with caution.

13. The safety system of claim 1, wherein the controller is integrated into one or more of the sensors.

14. The safety system of claim 1, in combination with an automated lifting operation system incorporating programmed control software, wherein the output from the safety system is used as an input to the control software.

15. A refuse collection vehicle including the safety system of claim 1.

16. A safety system for use with a refuse collection vehicle having a refuse storage body, the system operating to detect the presence of an object or person in the vicinity of the vehicle and communicate with a lifting operation system, wherein the vehicle has a lifting mechanism for engagement with a refuse bin, the lifting operation system operable to move the lifting mechanism between a first, lowered position at which the bin is on the ground in front of the vehicle and a second, raised position for discharge of the bin contents into the interior of the refuse storage body, the safety system including:

one or more sensors mounted on the vehicle able to monitor an area in the vicinity of the vehicle where the lifting mechanism lifts and lowers bins; and a controller operative to receive input data from the one or more sensors and process the data to provide a determination of the presence of an object or person, the controller further operative to control functioning of the lifting operation system in accordance with the determination by the controller, wherein, when an object or person is detected when the lifting mechanism is moving from said second, raised position to said first, the lowered position, the controller prevents further movement of the lifting mechanism in that direction, but does not prevent movement back towards said second, raised position.

17. The safety system of claim 16, including a, wherein the controller is configured to process the received input data to determine a change of scene within the area, the change of scene indicative of the presence of an object or person.

18. A vehicle equipped with the safety system of claim 16, having at least two said sensors mounted on the vehicle able to monitor an area in the vicinity of the vehicle where the lifting mechanism lifts and lowers bins, wherein the vehicle has a longitudinal centerline and a first and a second of the at least two said sensors are each spaced at least 800 mm from said longitudinal centreline.

19. A refuse collection vehicle equipped with the safety system of claim 16 having at least two said sensors mounted on the vehicle able to monitor an area in the vicinity of the vehicle where the lifting mechanism lifts and lowers bins, wherein the vehicle has a front cabin with two opposed sides defining right and left lateral extent of the cabin, each of a first and a second of said at least two sensors being positioned at a spacing of less than 300 mm from a respective side of the cabin.

20. A refuse collection vehicle equipped with the safety system of claim 16 having at least two said sensors mounted on the vehicle able to monitor an area in the vicinity of the vehicle where the lifting mechanism lifts and lowers bins, wherein each of a first and a second of the at least two sensors has a front face, the front face having a position which is in the range of between 80 mm in front of an external part of the vehicle and 30 mm behind said external part of the vehicle.

21. A refuse collection vehicle equipped with the safety system of claim 16 having at least two said sensors mounted on the vehicle able to monitor an area in the vicinity of the vehicle where the lifting mechanism lifts and lowers bins, wherein each of a first and a second of said at least two sensors is provided in a sensor unit, and each sensor unit is recessed into the external part of the vehicle.

22. A refuse collection vehicle equipped with the safety system of claim 21, wherein the vehicle is a front loading refuse collection vehicle and the external part of the vehicle is a front panel of the vehicle.

23. The refuse collection vehicle safety system of claim 22, wherein the front panel is shaped such that a part of it protrudes forwardly of the front cabin further than other parts, and the first and second sensors are mounted such that their front faces are not positioned further forward than the protruding front part of the front panel.

24. The safety system of claim 16, wherein the controller system can be selectively switched into an override mode to allow further movement towards said first, the lowered position.

25. The safety system of claim 24, wherein the system is configured to provide an audible alarm and a visual alert to an operator to provide a warning to an operator of the lifting operation system if the override mode is selected, to prompt that further operation be carried out with caution.

26. The safety system of claim 16, configured to be disabled or turned off when the vehicle is moving.

27. A refuse collection vehicle equipped with the safety system of claim 16 having at least three said sensors mounted on the vehicle able to monitor an area in the vicinity of the vehicle where the lifting mechanism lifts and lowers bins, the vehicle having a longitudinal centreline, wherein two of the sensors are, respectively, mounted on the sides of the front of the cabin and at least one sensor is mounted centrally on the front of the cabin.

28. The safety system of claim 16, wherein the controller is integrated into one or more of the sensors.

29. The safety system of claim 16, in combination with an automated lifting operation system incorporating programmed control software, wherein the output from the safety system is used as an input to the control software.

30. A refuse collection vehicle including the safety system of claim 16.

* * * * *